(12) United States Patent
Fan

(10) Patent No.: US 7,502,630 B2
(45) Date of Patent: Mar. 10, 2009

(54) METHOD AND SYSTEM FOR TRANSMITTING DATA BETWEEN A BASE TRANSCEIVER STATION AND A SUBSCRIBER UNIT

(75) Inventor: John Fan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 09/873,449

(22) Filed: Jun. 5, 2001

(65) Prior Publication Data

US 2002/0183065 A1    Dec. 5, 2002

(51) Int. Cl.
H04B 7/00 (2006.01)
H04B 1/38 (2006.01)
H04Q 7/20 (2006.01)
H04M 1/00 (2006.01)

(52) U.S. Cl. .................. 455/562.1; 455/69; 455/452.1; 455/509; 455/550.1; 455/556.2; 455/561

(58) Field of Classification Search ... 455/452.1–452.2, 455/450–451, 448, 424, 425, 434, 463–464, 455/19, 24, 500, 550.1, 78, 553.1, 575.6, 455/575.7, 95, 97, 129, 150.1, 151.1–2, 166.2, 455/59–62, 63.4, 65, 69, 82, 88, 101–103, 455/504–507, 509, 516–517, 556.2, 561; 375/347, 267, 299; 343/725–726, 702, 797, 343/853, 742, 729, 751, 765, 774–778, 792, 343/794, 801, 804, 824, 873, 893

See application file for complete search history.

(56) References Cited

U.S. PATENT DOCUMENTS 5,517,676 A * 5/1996 Sekine et al. ............ 455/575.5
5,940,452 A * 8/1999 Rich .......................... 375/347
6,018,651 A * 1/2000 Bruckert et al. .......... 455/277.1

(Continued)

OTHER PUBLICATIONS

Andrews, Michael R. et al., Tripling the Capacity of Wireless Communications Using Electromagnetic Polarization, Nature Magazine, Jan. 18, 2001, pp. 316-318, vol. 409.

(Continued)

Primary Examiner—Meless N Zewdu
(74) Attorney, Agent, or Firm—Kacvinsky LLC

(57) ABSTRACT

The invention includes a method and system for wirelessly transmitting data between a base transceiver station and a subscriber unit. The method comprises generating control signals to configure a base transceiver station to transmit selected data streams to a corresponding subscriber unit on an assigned channel of a multiple access protocol, transmitting in response to the control signals and in a spatially separate fashion, the selected data streams on the assigned channel of the multiple access protocol and utilizing co-located electric dipole and magnetic dipole antennae at the subscriber unit to receive the selected data streams. The system comprises means for generating control signals to configure a base transceiver station to transmit selected data streams to a corresponding subscriber unit on an assigned channel of a multiple access protocol, means for transmitting in response to the control signals and in a spatially separate fashion, selected data streams on the assigned channel of the multiple access protocol and means for utilizing co-located electric dipole and magnetic dipole antennae at the subscriber unit to receive the selected data streams.

28 Claims, 8 Drawing Sheets

U.S. PATENT DOCUMENTS

| | | | | |
|---|---|---|---|---|
| 6,021,317 | A * | 2/2000 | Irvin | 455/78 |
| 6,049,705 | A * | 4/2000 | Xue | 455/277.1 |
| 6,085,076 | A * | 7/2000 | Lindsay et al. | 455/277.1 |
| 6,195,064 | B1 * | 2/2001 | Andrews et al. | 343/797 |
| 6,204,817 | B1 * | 3/2001 | Edvardsson | 343/702 |
| 6,317,098 | B1 * | 11/2001 | Andrews et al. | 343/797 |
| 6,407,702 | B1 * | 6/2002 | Bergman et al. | 342/364 |
| 6,421,543 | B1 * | 7/2002 | Molnar | 455/562.1 |
| 6,646,615 | B2 * | 11/2003 | Andrews et al. | 343/726 |

OTHER PUBLICATIONS

Bertoni, Henry L, Talk is cheap in the city, Nature Magazine, Jan. 18, 2001, pp. 291-292, vol. 409, Macmillian Magazines, Ltd. USA.

* cited by examiner

METHOD AND SYSTEM FOR TRANSMITTING DATA BETWEEN A BASE TRANSCEIVER STATION AND A SUBSCRIBER UNIT

FIELD OF THE INVENTION

The invention relates generally to wireless communications. More particularly, the invention relates to transmitting between a base transceiver station having multiple antennas and subscriber units.

BACKGROUND OF THE INVENTION

Wireless communication systems commonly include information carrying modulated carrier signals that are wirelessly transmitted from a transmission source (for example, a base transceiver station) to one or more subscribers (for example, subscriber units) within an area or region.

Spatial Multiplexing

Spatial multiplexing is a transmission technology that exploits multiple antennae at both the base transceiver station and at the subscriber units to increase the bit rate in a wireless radio link with no additional power or bandwidth consumption. Under certain conditions, spatial multiplexing offers a linear increase in spectrum efficiency with the number of antennae. The substreams occupy the same channel of a multiple access protocol, the same time slot in a time-division multiple access protocol, the same frequency slot in frequency-division multiple access protocol, the same code sequence in code-division multiple access protocol or the same spatial target location in space-division multiple access protocol. The substreams are applied separately to the transmit antennae and transmitted through a radio channel. Due to the presence of various scattering objects in the environment, each signal experiences multipath propagation.

The composite signals resulting from the transmission are finally captured by an array of receiving antennae with random phase and amplitudes. At the subscriber array, a spatial signature of each of the received signals is estimated. Based on the spatial signatures, a signal processing technique is applied to separate the signals, recovering the original substreams.

FIG. 1 shows three transmitter antenna arrays 110, 120, 130. The transmitter antenna arrays 110, 120, 130 transmit data symbols to a subscriber antenna array 140. Each transmitter antenna array includes spatially separate antennae or cross polarization configuration. A subscriber connected to the subscriber antenna array 140 separates the received signals.

FIG. 2 shows modulated carrier signals traveling from a transmitter 210 to a subscriber 220 following many different (multiple) transmission paths.

Multipath can include a composition of a primary signal plus duplicate or echoed images caused by reflections of signals off objects between the transmitter and subscriber. The subscriber may receive the primary signal sent by the transmitter, but also receives secondary signals that are reflected off objects located in the signal path. The reflected signals arrive at the subscriber later than the primary signal. Due to this misalignment, the multipath signals can cause intersymbol interference or distortion of the received signal.

The actual received signal can include a combination of a primary signal and several reflected signals. Because the distance traveled by the original signal is shorter than the reflected signals, the signals are received at different times. The time difference between the first received and the last received signal is called the delay spread and can be as great as several microseconds.

The multiple paths traveled by the modulated carrier signal typically result in fading of the modulated carrier signal. Fading causes the modulated carrier signal to attenuate in amplitude when multiple paths cancel.

Communication Diversity

Antenna diversity is a technique used in multiple antenna-based communication system to reduce the effects of multi-path fading. Antenna diversity can be obtained by providing a transmitter and/or a subscriber with two or more antennae. These multiple antennae imply multiple channels that suffer from fading in a statistically independent manner. Therefore, when one channel is fading due to the destructive effects of multi-path interference, another of the channels is unlikely to be suffering from fading simultaneously. By virtue of the redundancy provided by these independent channels, a subscriber can often reduce the detrimental effects of fading.

In order to implement the spatial multiplexing/communication diversity technology, multiple antennae within a group have to be separated by a small distance, which could be as small as half the radio wavelength if they are located at the subscriber unit, or several wavelengths, if they are at the base station. Depending on the frequency band used by the wireless network, the wavelength is about one-eighth of a meter. As a result, multiple antennae cannot be used in palm-sized devices due to size constraints.

It is desirable to have a method and system that provides receive diversity without having to use spatially separate antennae. It is desirable that the method and system be simple, cost effective and capable of being easily adapted to existing technology. The present invention addresses such a need.

SUMMARY OF THE INVENTION

The invention includes a method and system for wirelessly transmitting data between a base transceiver station and a subscriber unit. The method and system implements a multiple polarization scheme at the subscriber unit in order to achieve receive diversity. This provides an extra factor in channel capacity relative to conventional implementations.

A first embodiment of the invention comprises a method for wirelessly transmitting data between a base transceiver station and a subscriber unit, the base transceiver station comprising a plurality of transmit antennae. The method comprises generating control signals to configure the base transceiver station to transmit selected data streams to a corresponding subscriber unit on an assigned channel of a multiple access protocol, transmitting in response to the control signals and in a spatially separate fashion, the selected data streams on the assigned channel of the multiple access protocol and utilizing co-located electric dipole and magnetic dipole antennae at the subscriber unit to receive the selected data streams.

A second embodiment of the present invention comprises a method for wirelessly receiving data at a base transceiver station from a subscriber unit, the base transceiver station comprising a plurality of antennae. The method comprises utilizing co-located electric dipole antennae at the subscriber unit to transmit selected data streams on an assigned channel of a multiple access protocol, generating control signals to configure the base transceiver station to receive the selected data streams from the subscriber unit on the assigned channel of a multiple access protocol and receiving in response to the control signals the selected data streams on the assigned channel of the multiple access protocol.

A third embodiment of the invention comprises a system for wirelessly transmitting data between a base transceiver station and a subscriber unit, the base transceiver station comprising a plurality of transmit antennae. The system comprises means for generating control signals to configure the base transceiver station to transmit selected data streams to a corresponding subscriber unit on an assigned channel of a multiple access protocol, means for transmitting in response to the control signals and in a spatially separate fashion, the selected data streams on the assigned channel of the multiple access protocol and means for utilizing co-located electric dipole and magnetic dipole antennae at the subscriber unit to receive the selected data streams.

A fourth embodiment of the present invention is a system for wirelessly receiving data at a base transceiver station from a subscriber unit, the base transceiver station comprising a plurality of antennae. The system comprises means for utilizing co-located electric dipole antennae at the subscriber unit to transmit selected data streams on an assigned channel of a multiple access protocol, means for generating control signals to configure the base transceiver station to receive the selected data streams from the subscriber unit on the assigned channel of a multiple access protocol and means for receiving in response to the control signals the selected data streams on the assigned channel of the multiple access protocol.

Other aspects and advantages of the present invention will become apparent from the following detailed description, taken in conjunction with the accompanying drawings, illustrating by way of example the principles of the invention.

DETAILED DESCRIPTION

Figure 1:
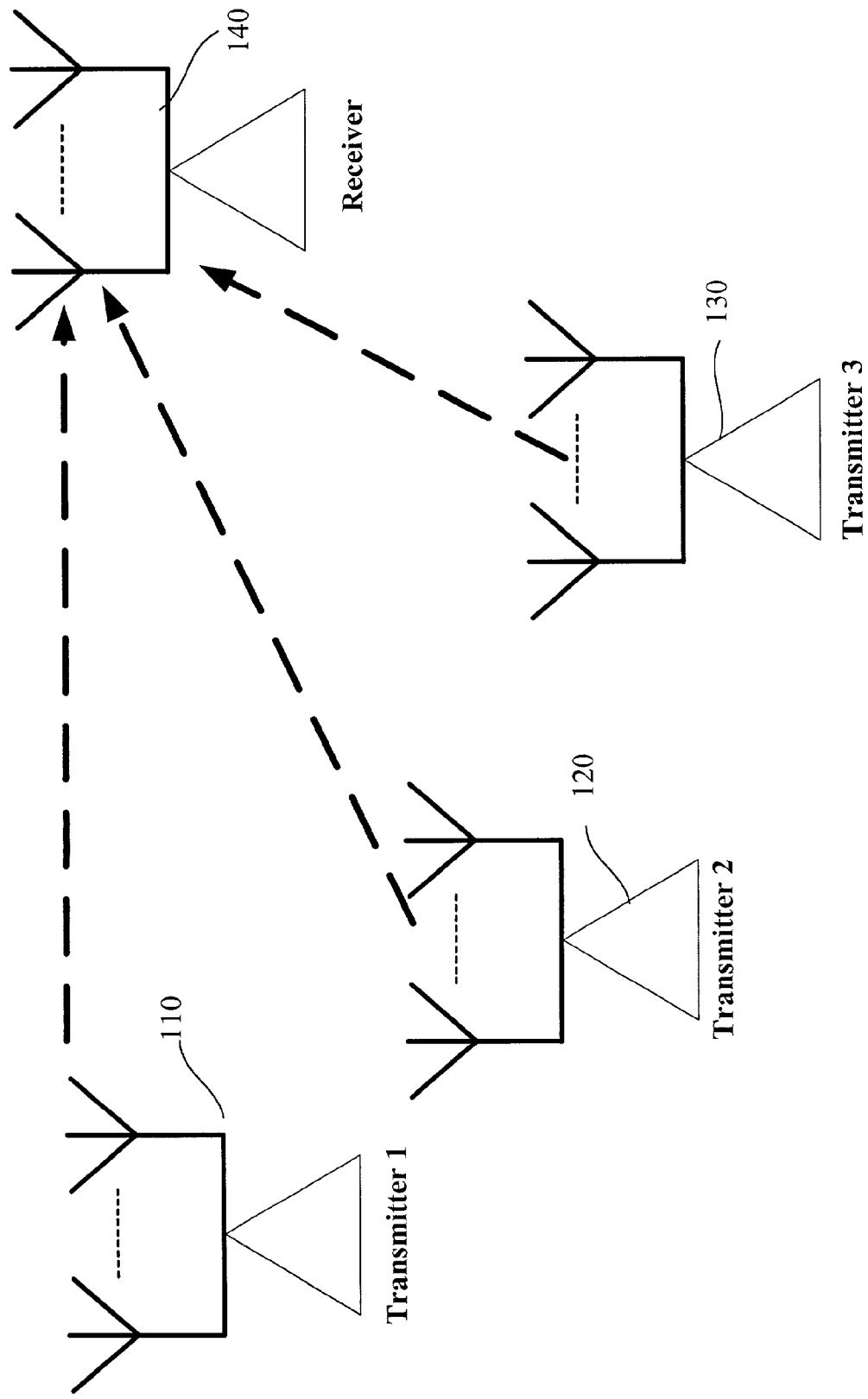
FIG. 1 shows a prior art wireless system that includes spatially separate transmitters.
Figure 2:
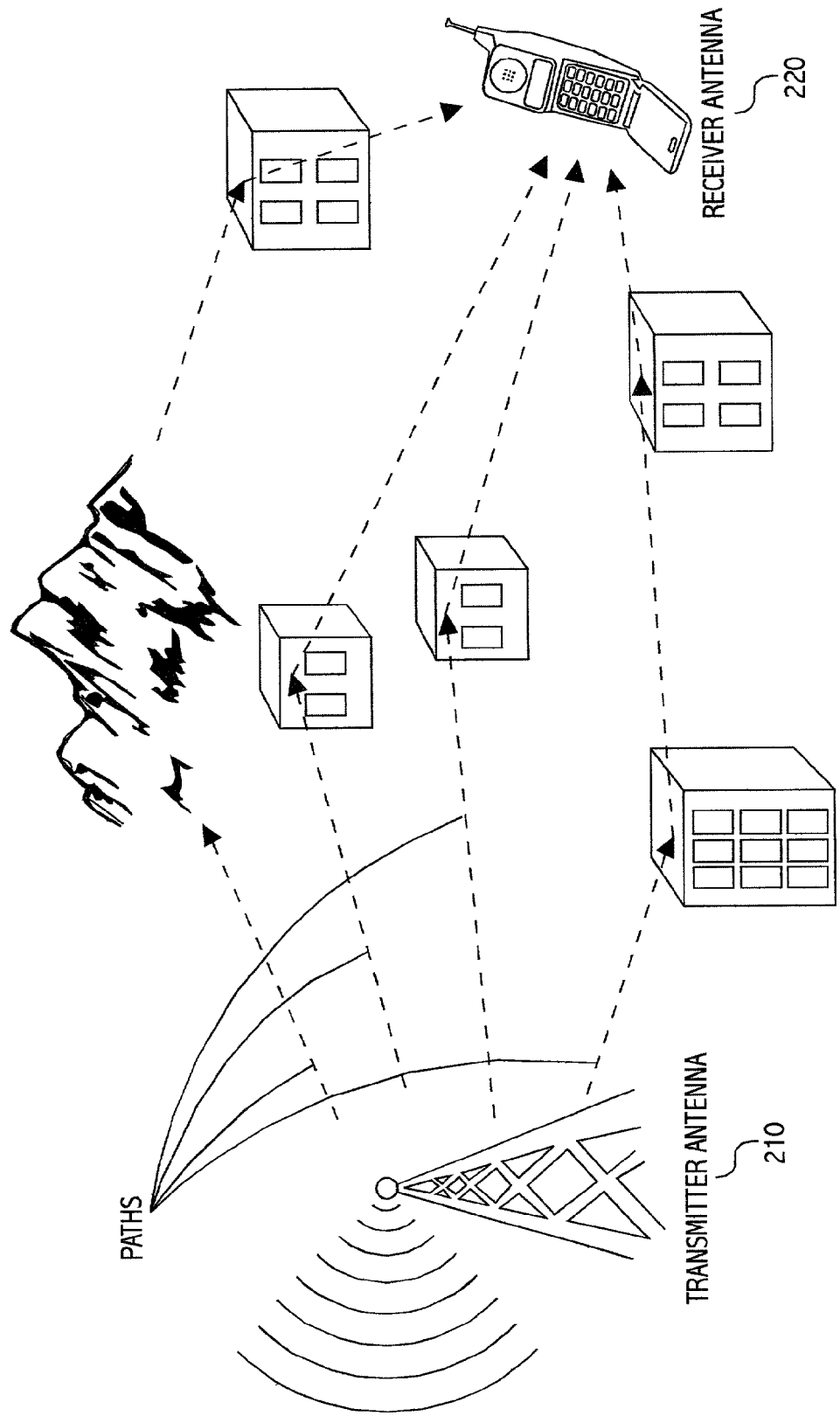
FIG. 2 shows a prior art wireless system that includes multiple paths from a system transmitter to a system subscriber.

The present invention relates to a method and system for wirelessly transmitting data between a base transceiver station and a subscriber unit. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

As shown in the drawings for purposes of illustration, the invention is embodied in a method and system for wirelessly transmitting data between a base transceiver station and a subscriber unit. The method and system implements a multiple polarization scheme at the subscriber unit in order to achieve receive diversity. In a scattering environment, this provides an extra factor in channel capacity relative to conventional single antenna or dual polarized antennae at the subscriber unit. The extra capacity arises because there are six distinguishable electric and magnetic states of polarization at a given point, rather than two as is usually assumed.

Figure 3:
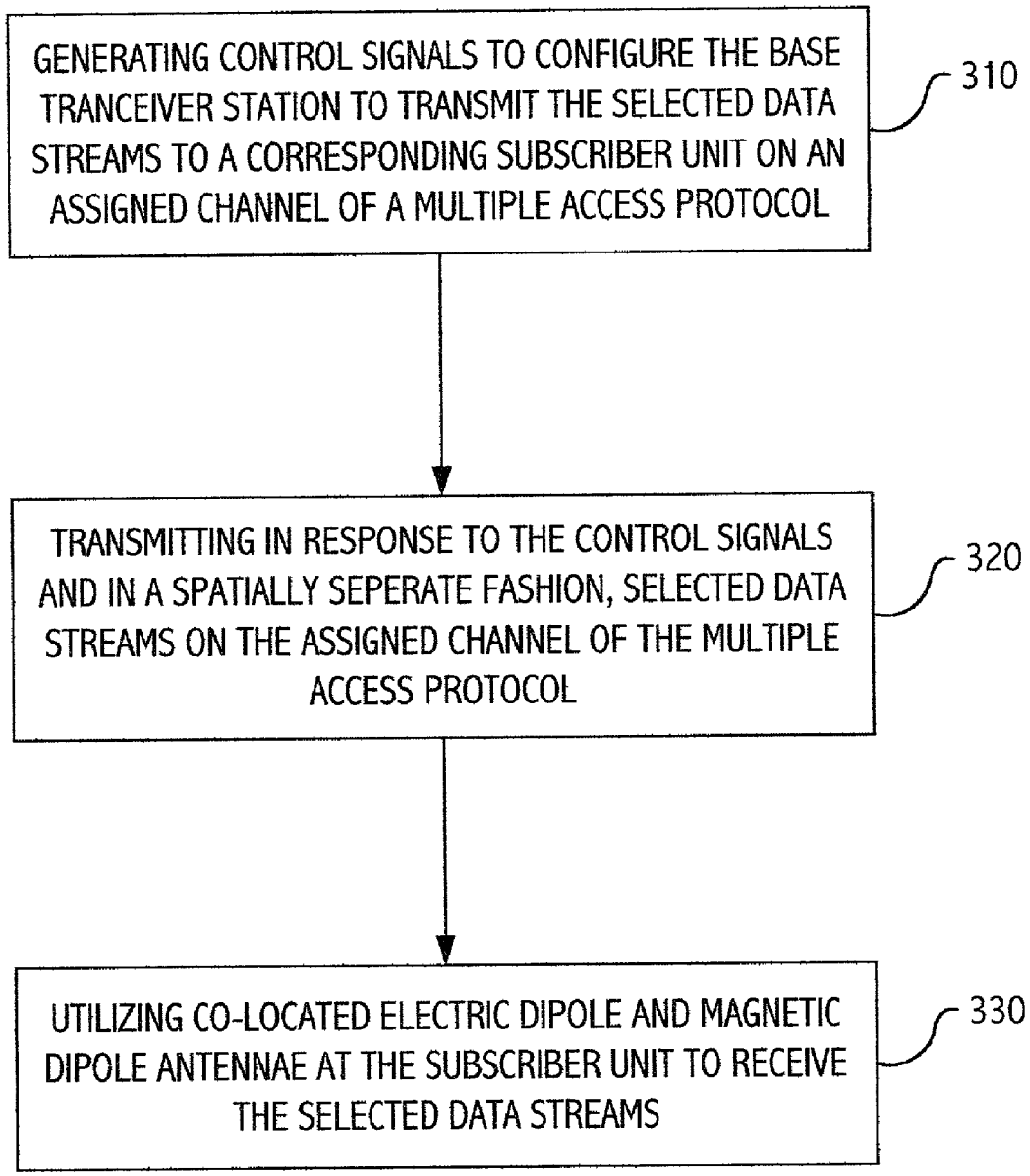
FIG. 3 shows a high-level flowchart of the method in accordance with the present invention.

For a further understanding of the present invention please refer to FIG. 3. FIG. 3 is a high-level flowchart of method in accordance with the present invention. First, control signals are generated to configure the base transceiver station to transmit selected data streams to a corresponding subscriber unit on an assigned channel of a multiple access protocol, via step 310. Next, the selected data streams are transmitted in response to the control signals on the assigned channel of the multiple access protocol, via step 320. Preferably, a spatial multiplexing technology is implemented to transmit the data streams. Further information about the type of spatial multiplexing technology preferably implemented is set forth in U.S. Pat. No. 6,067,290 issued May 23, 2000 entitled "SPATIAL MULTIPLEXING IN A CELLULAR NETWORK", which is incorporated herein by this reference. Finally, co-located electric dipole and magnetic dipole antennae are utilized at the subscriber unit to receive the selected data streams, via step 330. Preferably, the electric dipole and magnetic dipole antennae create a multiple polarization scheme at the subscriber unit in order to achieve receive diversity.

As previously mentioned, in a scattering environment, the multiple polarization scheme provides an extra factor in channel capacity relative to conventional dual polarized radio signals. This situation arises because in free space, radiated electric and magnetic fields are constrained to be perpendicular to one another and to the direction of propagation. Thus, once the direction of propagation is fixed, only two degrees of freedom remain which are typically referred to as either horizontal or vertical (linear) polarizations. In the presence of a reflecting surface, however, multiple paths are possible between two points. Although the wave propagating along the direct path cannot have an electric field component parallel to that path, the wave propagating along the reflected path can contribute such a component to the field at the subscriber unit (it is effectively a longitudinal component with respect to the line-of-sight). Accordingly, the presence of a single reflecting surface allows for the use of three channels of electric-field polarization for wireless communication since the electromagnetic polarization is no longer constrained to be perpendicular to the line-of-sight.

Figure 4:
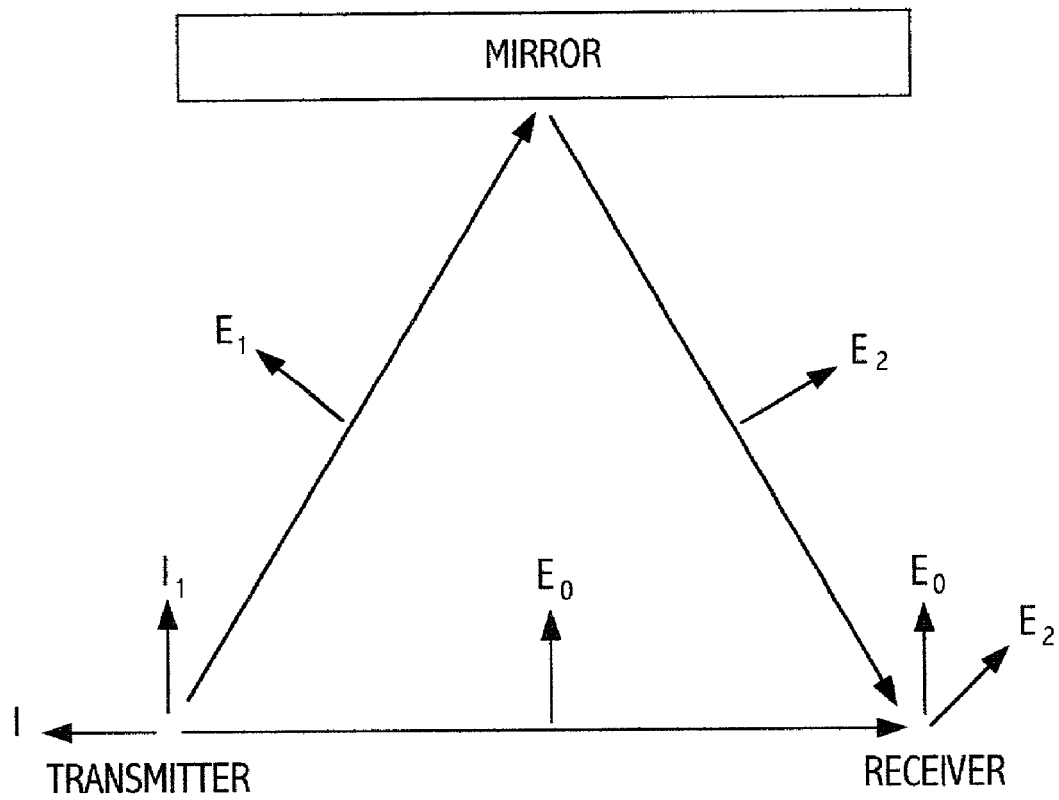
FIG. 4 is an illustration of how the presence of a single reflecting surface allows for the use of three channels of electric-field polarization in a wireless communication environment.

To better understand this concept, please refer to FIG. 4. FIG. 4 is an illustration of how the presence of a single reflecting surface allows for the use of three channels of electric-field polarization in a wireless communication environment. In the two-dimensional plane of FIG. 4, orthogonal current dipoles at the transmitter, I and I' control two degrees of electric field freedom at the receiver (subscriber unit), $E_0$ and $E_2$. The direction perpendicular to the plane contributes a third degree of freedom ($E_0$, $E_1$, $E_2$ are transverse fields on the three paths shown). Normally, due to transverse propagation of electromagnetic waves, there would be no longitudinal electric field component at the receiver (subscriber unit). Thus, as is shown, without the mirror the current dipole labeled I would not produce electric fields at the receiver (subscriber unit). However, the alternative propagation path shown causes the component $E_2$ to appear at the receiver (subscriber unit), which has non-zero longitudinal projection when referred to the non-reflected path.

The multiple transmitter antennae and multiple polarization antennae scheme at the subscriber unit allow the wireless communication system to include spatial multiplexing and communication diversity while achieving receive diversity. As described earlier, spatial multiplexing and communication diversity can improve the capacity of the communication system and reduce the effects of fading and multi-path resulting in increased capacity.

Radio Frequency (RF) signals are coupled between the transmitter antennae and the subscriber unit antennae. The RF signals are modulated with data streams. The signals transmitted from the transmitter antennae can be formed from different data streams (spatial multiplexing) or from one data stream (transmit diversity) or both.

Assuming a transmission channel having a flat frequency response (no significant multipath delay spread), the input-output relationship of the transmission channel between the transmitter and the subscriber unit of a general wireless system can be represented by H where H is a 6×6 matrix relating the electric (E) and magnetic (B) fields measured at a point r, owing to idealized oscillating electric (p) and magnetic (m) dipole moments, produced by transmitting antennae at point r':

$$\begin{bmatrix} E(r) \\ cB(r) \end{bmatrix} = -H(k, r-r') \begin{bmatrix} cp \\ m \end{bmatrix} \quad (1)$$

where in free space and in the far-field, H is given by a compact version of the standard formulas that describe the fields radiated by oscillating electric and magnetic dipoles (in SI units):

$$H_0(k, r) = \frac{|k|^3}{\epsilon_0 c} \frac{e^{ikr}}{4\pi k \cdot r} \begin{bmatrix} J^2(\hat{r}) & J(\hat{r}) \\ -J(\hat{r}) & J^2(\hat{r}) \end{bmatrix} \quad (2)$$

Here k is the wave vector ($|k|=\omega/c=2\pi/\lambda$) and $1/\epsilon_0 c \approx 377\Omega$ is the impedance of free space (c is the speed of light). $J(\hat{r})$ is a 3×3 matrix given by $J_{ij}(r) = \Sigma_k \epsilon_{ikj} r_k$ defined so that $J(r)p = r \times p$ (with $\hat{r} = r/|r|$).

The communication channel associated with equation (1) includes additive noise measured by the subscriber unit. For simplicity, it is assumed that its components are uncorrelated gaussian white noise with equal variance, and that communication takes place over a sufficiently narrow bandwidth that H has negligible frequency dependence ('flat fading').

For a time-independent H, the rate at which information can be transferred between an N-antennae transmitter/subscriber unit pair (N=6 in equations (1) and (2) above) is characterized by the quantity:

$$M(H) = \log_2 \det[I + (\rho/n)HH^\dagger] \quad (3)$$

where M(H), in bits per second per hertz, is the mutual information between the transmitter and subscriber unit when the transmitted signals are uncorrelated white gaussian stochastic processes with equal power. Both total power and signal-to-noise ratio are denoted by the same symbol ρ. The significance of M(H) is that for a fluctuating H, under appropriate conditions, the capacity C of the channel is given by the expectation of M(H) taken over the probability distribution of H. The conditions are that H is known by the subscriber unit but not by the transmitter (as would be the case if transmitted pilot signals help the subscriber unit calculate H). If the channel is known to the transmitter, the capacity will be higher and is given by the "water filling" solution where power is unevenly divided among transmitting antennae.

The capacity depends on the rank of H. It follows by inspection that a large signal-to-noise ratio ρ, M(H) (and therefore C) tends to the value m $\log_2 \rho$, where m=rank (H). The large ρ limit is taken for fixed H. It is easy to verify that the rank of $H_0$ (see equation (2)) is two, which corresponds to the notion of there being only two polarization degrees of freedom in free space. The number of polarization channels is now formally defined as rank (H). It is accordingly summarized that it is possible to have rank (H)=6 in an environment with scattering, with a concomitant increase in the capacity of the wireless communication channel. It should be noted that six independent signals have to be transmitted in order to take advantage of this increased capacity.

Figure 5:
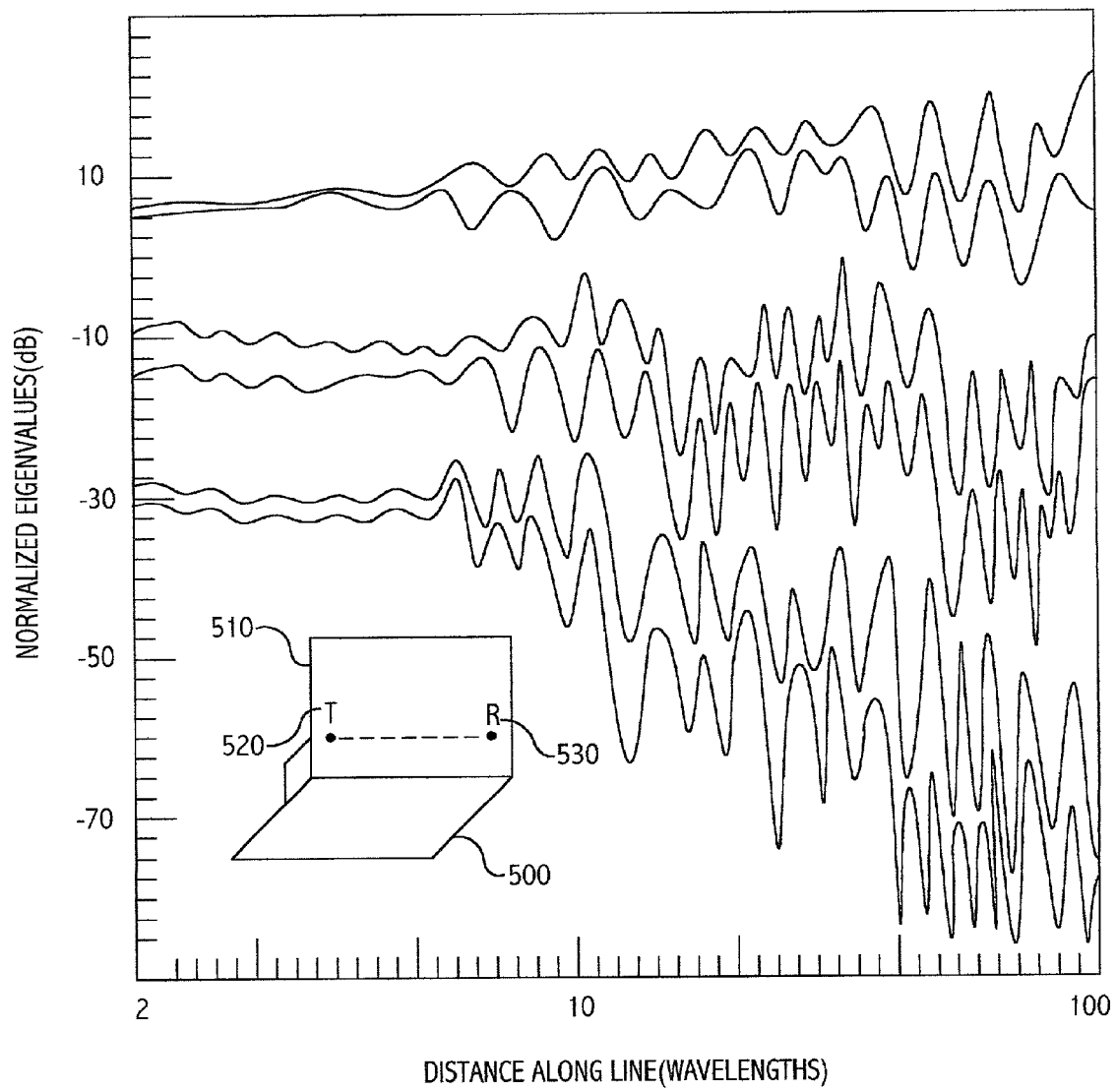
FIG. 5 is an illustration of a simple geometry that shows why rank (H)=6 in scattering environments.

For a better understanding please refer to FIG. 5. FIG. 5 is an illustration of a simple geometry that shows why rank (H)=6 in scattering environments. FIG. 5 shows two perfectly conducting planes 500, 510 at right angles to each other. The matrix H (equation (1)) in this environment may be computed by summing over free-space contributions like $H_0$ (equation (2)) corresponding to the actual transmitter and its images in the two mirrors (two single and one double reflection). The eigenvalues of $HH^\dagger$ are plotted for the transmitter and subscriber unit with data obtained by simulating the A subscriber unit 530 at a variable distance from the transmitter 520 along the line indicated by the inset. It should be noted that all six eigenvalues are non-zero and hence rank (H)=6, signifying a threefold increase in capacity over what would be possible in free space. For a further understanding, see "Tripling the capacity of wireless communications using electromagnetic polarization" by M. R. Andrews, P. P. Mitra and R. deCarvalho, Nature, vol. 409, 18 Jan. 2001, pp. 316-318.

Apart from increasing the number of degrees of freedom in wireless electromagnetic communications, the existence of six independent channels as indicated by the full rank of H also implies improved fading performance of a subscriber unit sensitive to polarization degrees of freedom. As the environment fluctuates, or as the subscriber unit moves through space, the measured electric and magnetic fields also fluctuate. For an antenna sensitive to just a single field component the amplitude can occasionally come close to zero (fading); however, it is quite unlikely that all six vector components will vanish simultaneously. Thus by taking full advantage of the receive diversity that is offered by this type of polarization the fading can be greatly ameliorated.

Figure 6:
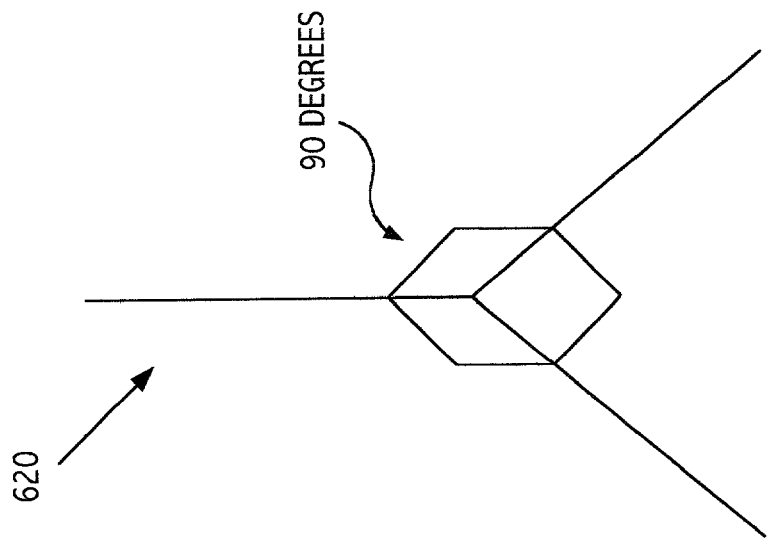
FIG. 6 is an illustration of three electric dipole antennae in the x, y, and z directions as well as three magnetic dipole antennae in the x, y, z direction.
Figure 6:
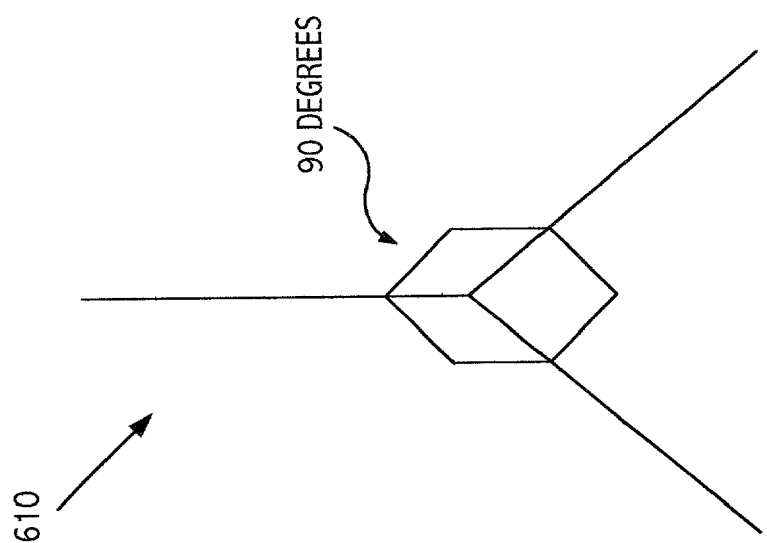

In order to accommodate this phenomenon and achieve receive diversity, a co-located set of antennae are utilized at the subscriber unit. This set of antennae preferably comprises three electric dipole antennae in the x, y, and z directions as well as three magnetic dipole antennae in the x, y, z direction. Please refer to FIG. 6 for an illustration of three electric dipole antennae 610 in the x, y, and z directions as well as three magnetic dipole antennae 620 in the x, y, z direction. Accordingly, the electric dipole antennae (three different polarizations) and the magnetic dipole antennae (three different polarizations) are combined at the subscriber unit thereby giving 6 orders of receive diversity with a single co-located set of antennae. By using this single co-located set of antennae at the subscriber unit, receive diversity can be achieved without having to rely upon spatial separation of the antennae. Consequently, receive diversity can be achieved in palm-sized devices (mobile phones, pagers, etc.) where the spatial separation of the receive antennae is restricted due to the size of the device.

Figure 7:
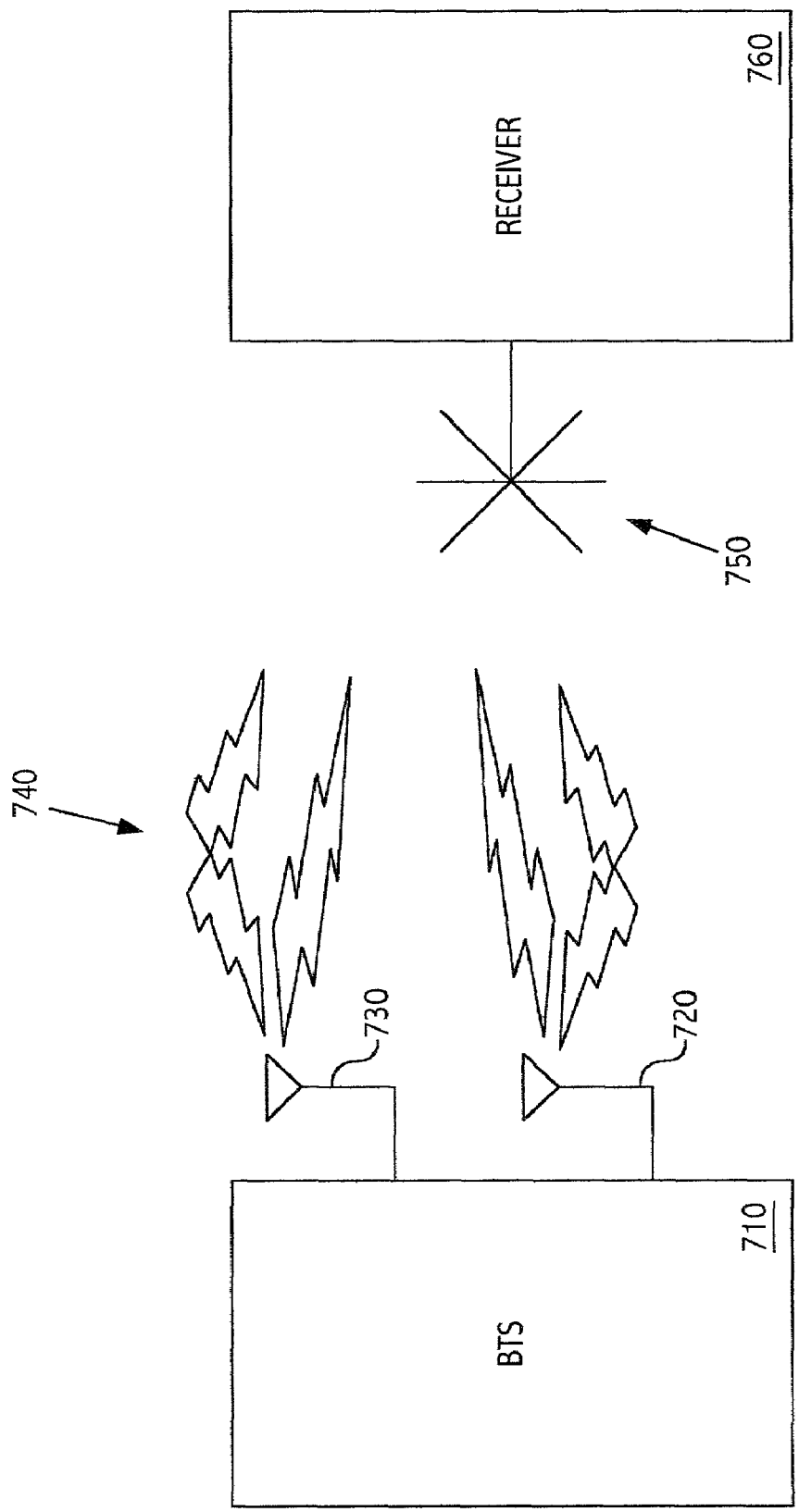
FIG. 7 shows a wireless system in accordance with the present invention.

For a more detailed illustration, please refer now to FIG. 7. FIG. 7 shows a wireless system in accordance with the present invention. The system includes at least one base transceiver station 710 wherein the base transceiver station comprises at least two spatially separate transmit antennae 720, 730. Data streams are transmitted via a scattering channel 740 to a single set of co-located electric and magnetic dipole antennae 750 at the subscriber unit 760. The amount of receive diversity available in the channel will determine the number of transmit antennae to use.

It should be noted that although the above-described invention is described in terms of the subscriber unit achieving receive diversity through the utilization of a multiple polarization scheme to receive data, one of ordinary skill in the art will readily recognize that the multiple polarization scheme can also be utilized to transmit data to the base transceiver station while remaining within the spirit and scope of the present invention.

Figure 8:
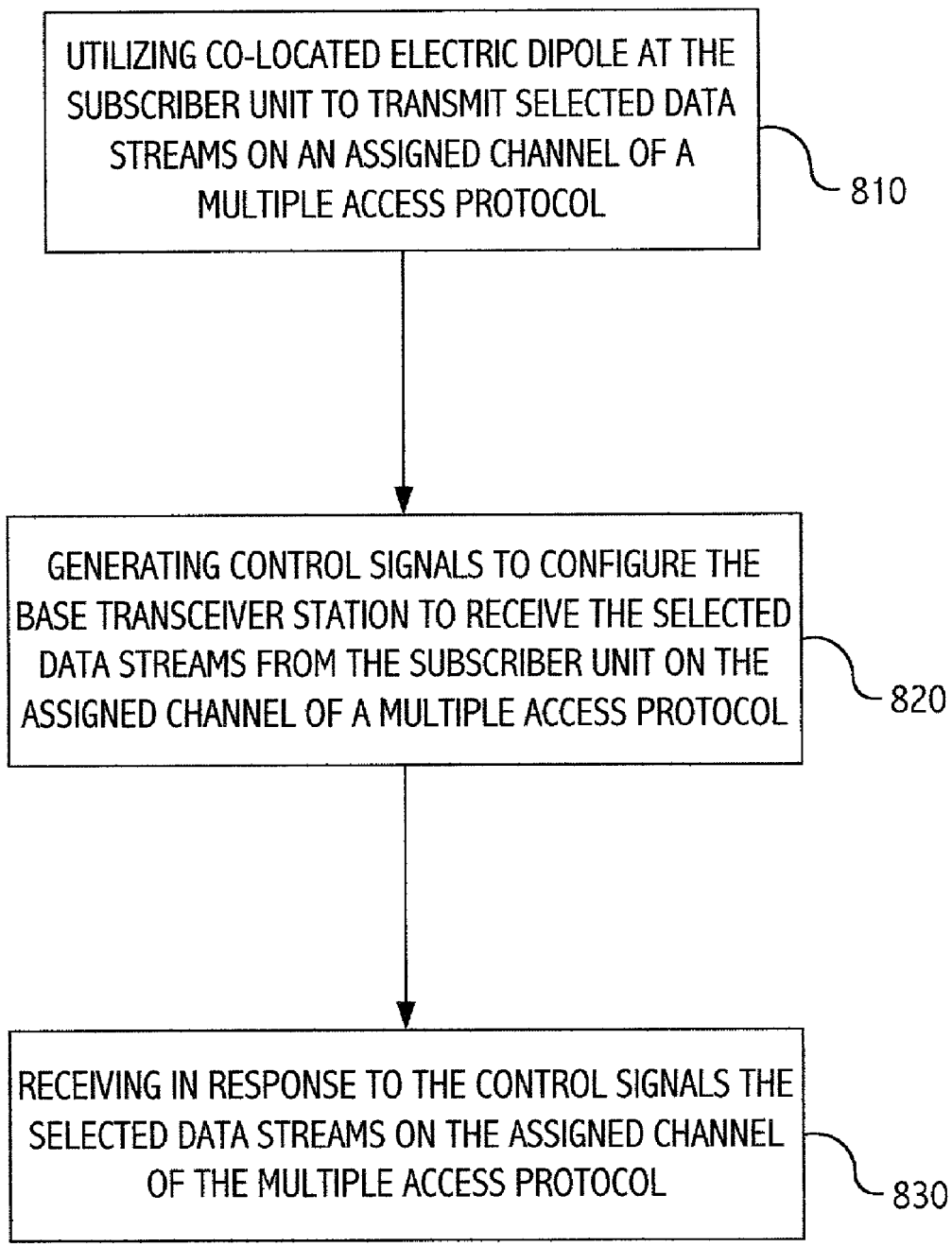
FIG. 8 is a high-level flowchart of an alternative embodiment of the method in accordance with the present invention.
Figure 3:
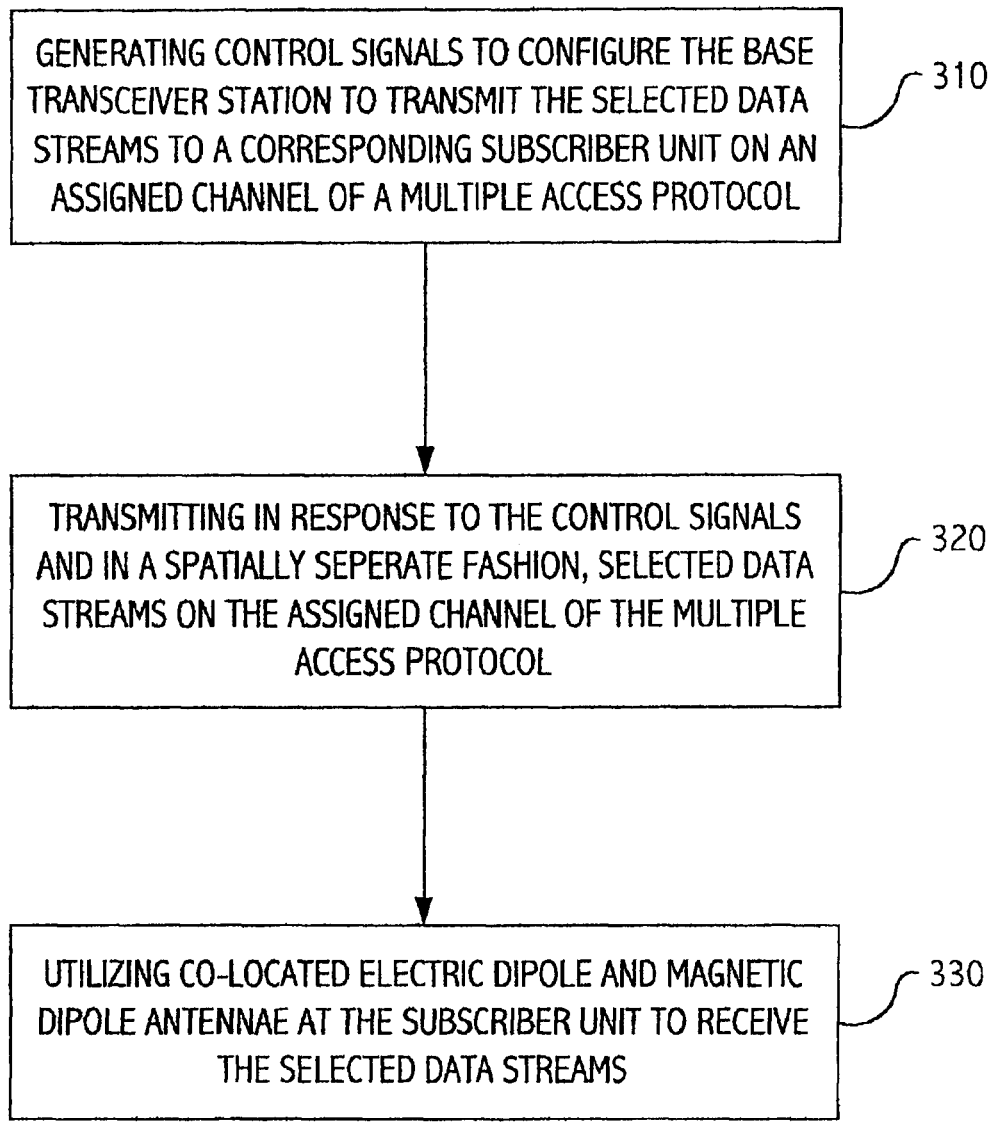

For an example of such an implementation, please refer to FIG. 8. FIG. 8 is a high-level flowchart of an alternative embodiment of the method in accordance with the present invention. First, co-located electric dipole are utilized at the subscriber unit to transmit selected data streams on an assigned channel of a multiple access protocol, via step 810. Next, control signals are generated to configure the base transceiver station to receive the selected data streams from the subscriber unit on the assigned channel of a multiple access protocol, via step 820. Finally, the selected data streams are received in response to the control signals on the assigned channel of the multiple access protocol, via step 830.

The above-described method and system in accordance with the present invention implements a multiple polarization scheme at the subscriber unit in order to achieve receive diversity. In a scattering environment, this provides an extra factor in channel capacity relative to conventional dual polarized radio signals. The extra capacity arises because there are six distinguishable electric and magnetic states of polarization at a given point, rather than two as is usually assumed. Furthermore, through the use of a single set of co-located antennae at the subscriber unit, the method and system allow devices where the spatial separation of the receive antennae is restricted (i.e. palm-sized devices) to achieve receive diversity.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of appended claims.

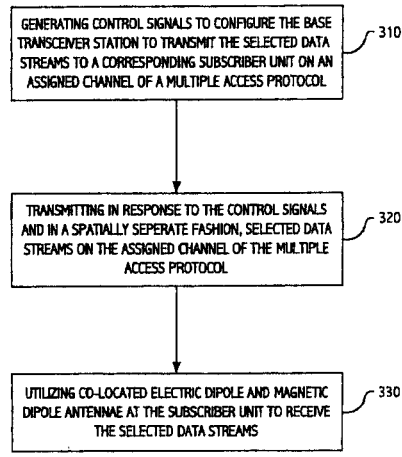

What is claimed:

1. A method for increasing channel diversity in a mobile communications device, the method comprising:
    generating control signals to configure a base transceiver station to transmit selected data streams to the mobile communications device on an assigned communication channel of a multiple access protocol; and
    receiving one or more select data stream(s) associated with the assigned communication channel from a transmitter at the mobile communication device through a plurality (N) of electric dipole antennae and a plurality (M) of magnetic dipole antennae, each of said antennae characterized by a distinct polarization with respect to another, said electric dipole antennae and magnetic dipole antennae co-located in a common antennae structure at the mobile communications device to provide at least N+M uncorrelated spatial streams of channel diversity of the received communication channel to a receiver within the mobile communications device.

2. The method of claim 1 wherein each electric dipole antennae has a different polarization.

3. The method of claim 1 wherein each magnetic dipole antenna has a different polarization.

4. The method of claim 1 wherein the electric dipole antennae comprise 3 electric dipole antennae and the magnetic dipole antennae comprise 3 magnetic dipole antennae.

5. The method of claim 4 wherein the 3 electric dipole antennae have 3 different polarizations and the 3 magnetic dipole antennae have 3 different polarizations.

6. The method of claim 4 wherein the data streams are transmitted via a scattering channel.

7. The method of claim 1 wherein the mobile communications device comprises a palm sized device.

8. The method of claim 7 wherein the electric dipole antennae comprise 3 electric dipole antennae and the magnetic dipole antennae comprise 3 magnetic dipole antennae.

9. The method of claim 8 wherein the 3 electric dipole antennae have 3 different polarizations and the 3 magnetic dipole antennae have 3 different polarizations.

10. The method of claim 9 wherein the data streams are transmitted via a scattering channel.

11. A method for transmitting data from a mobile communications device, the method comprising:
    transmitting selected data streams on an assigned channel of a multiple access protocol via selected ones of a plurality (N) of electric dipole antennae and a plurality (M) of magnetic dipole antennae co-located at the mobile communication device as a single antenna structure, each antenna characterized by a distinct polarization with respect to any other antennae within the single antennae structure to generate at least N+M uncorrelated spatial streams of channel diversity from the single antenna structure; and
    generating control signals from the mobile computing device to configure a base transceiver station to receive selected data streams from the mobile communications device on the assigned channel of the multiple access protocol.

12. The method of claim 11 wherein the electric dipole antennae comprise 3 electric dipole antennae.

13. The method of claim 12 wherein the 3 electric dipole antennae have 3 different polarizations.

14. The method of claim 13 wherein the data streams are transmitted via a scattering channel.

15. The method of claim 11 wherein the mobile communications device comprises a palm sized device.

16. A mobile communications device comprising:
    means for generating control signals to configure a base transceiver station to transmit selected data streams to the mobile communications device on an assigned communication channel of a multiple access protocol;
    a transmitter, to prepare data for transmission; and
    a plurality (N) of electric dipole antennae and a plurality (M) of magnetic dipole antennae co-located at the mobile communications device as a single antennae structure, responsive to the transmitter to effect transmission of the prepared data through the assigned communication channel to a receiver in the configured base transceiver station, wherein each of the antennae has a distinct polarization with respect to any other antennae of the structure to generate at least N+M uncorrelated spatial streams composing the assigned communication channel.

17. The device of claim 16 wherein the electric dipole antennae comprise 3 electric dipole antennae and the magnetic dipole antennae comprise 3 magnetic dipole antennae.

18. The device of claim 17 wherein the 3 electric dipole antennae have 3 different polarizations and the 3 magnetic dipole antennae have 3 different polarizations.

19. The device of claim 18 wherein the data streams are transmitted via a scattering channel.

20. The device of claim 16 wherein the device comprises a palm sized device.

21. The device of claim 20 wherein the electric dipole antennae comprise 3 electric dipole antennae and the magnetic dipole antennae comprise 3 magnetic dipole antennae.

22. The device of claim 21 wherein the 3 electric dipole antennae have 3 different polarizations and the 3 magnetic dipole antennae have 3 different polarizations.

23. The device of claim 22 wherein the data streams are transmitted via a scattering channel.

24. A mobile communications device comprising:
a plurality (N) of electric dipole antennae and a plurality (M) of magnetic dipole antennae, co-located at the mobile communications device as a single antenna structure, responsive to a received wireless communication channel wherein each of the plurality of antennae has a different polarization with respect to any other antennae within the single antennae structure to produce at least N+M uncorrelated spatial streams of channels from the received wireless communication channel;
means for generating control signals to configure a base transceiver station to receive selected data streams from the mobile communications device on the wireless communication channel of a multiple access protocol; and
the receiver, selectively responsive to at least a subset of the plurality of antennae, to process the N+M uncorrelated spatial streams to recover the selected data streams transmitted on the assigned channel of the multiple access protocol.

25. The device of claim 24 wherein 3 electric dipole antennae have 3 different polarizations, and 3 magnetic dipole antennae have 3 different polarizations.

26. The device of claim 25 wherein the data streams are transmitted via a scattering channel.

27. Wherein the device of claim 24 comprise a palm sized device.

28. A method comprising:
generating control signals to configure a base transceiver station to transmit selected data streams to a mobile communications device on an assigned channel of a multiple access protocol, wherein the assigned channel comprises a scattering channel; and
receiving a scattered wireless communication channel at the mobile communications device utilizing six (6) co-located antennae at the mobile communications device, wherein the 6 co-located antennae comprise 3 electric dipole antennae and 3 magnetic dipole antennae disposed on a single antennae structure, each antenna characterized by a distinct polarization with respect to any other antennae within the single antennae structure to recover 6 uncorrelated spatial streams from the received scattered wireless communication channel.

* * * * *

UNITED STATES PATENT AND TRADEMARK OFFICE
CERTIFICATE OF CORRECTION

PATENT NO. : 7,502,630 B2 Page 1 of 3
APPLICATION NO. : 09/873449
DATED : March 10, 2009
INVENTOR(S) : Fan It is certified that error appears in the above-identified patent and that said Letters Patent is hereby corrected as shown below:

The title page showing the illustrative figure should be deleted to be replaced with the attached title page.

The drawing sheet, consisting of Fig. 3, should be deleted to be replaced with the drawing sheet, consisting of Fig. 3, as shown on the attached pages.

Signed and Sealed this

Eleventh Day of May, 2010

David J. Kappos
*Director of the United States Patent and Trademark Office*

CERTIFICATE OF CORRECTION (continued)

(12) United States Patent
Fan

(10) Patent No.: US 7,502,630 B2
(45) Date of Patent: Mar. 10, 2009

(54) METHOD AND SYSTEM FOR TRANSMITTING DATA BETWEEN A BASE TRANSCEIVER STATION AND A SUBSCRIBER UNIT

(75) Inventor: John Fan, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 274 days.

(21) Appl. No.: 09/873,449

(22) Filed: Jun. 5, 2001

(65) Prior Publication Data
US 2002/0183065 A1 Dec. 5, 2002

(51) Int. Cl.
*H04B 7/00* (2006.01)
*H04B 1/38* (2006.01)
*H04Q 7/20* (2006.01)
*H04M 1/00* (2006.01)

(52) U.S. Cl. ............... 455/562.1; 455/69; 455/452.1; 455/509; 455/550.1; 455/556.2; 455/561

(58) Field of Classification Search ... 455/452.1 452.2, 455/450–451, 448, 424, 425, 434, 463–464, 455/19, 24, 500, 550.1, 78, 553.1, 575.6, 455/575.7, 95, 97, 129, 150.1, 151.1–2, 166.2, 455/59–62, 63.4, 65, 69, 82, 88, 101–103, 455/504–507, 509, 516–517, 556.2, 561; 375/347, 267, 299; 343/725–726, 702, 797, 343/853, 742, 729, 751, 765, 774–778, 792, 343/794, 801, 804, 824, 873, 893
See application file for complete search history.

(56) References Cited

U.S. PATENT DOCUMENTS 5,517,676 A * 5/1996 Sekine et al. ............ 455/575.5
5,940,452 A * 8/1999 Rich ......................... 375/347
6,018,651 A * 1/2000 Bruckert et al. ........ 455/277.1

(Continued)

OTHER PUBLICATIONS

Andrews, Michael R. et al., Tripling the Capacity of Wireless Communications Using Electromagnetic Polarization, Nature Magazine, Jan. 18, 2001, pp. 316-318, vol. 409.

(Continued)

*Primary Examiner*—Meless N Zewdu
(74) *Attorney, Agent, or Firm*—Kacvinsky LLC

(57) ABSTRACT

The invention includes a method and system for wirelessly transmitting data between a base transceiver station and a subscriber unit. The method comprises generating control signals to configure a base transceiver station to transmit selected data streams to a corresponding subscriber unit on an assigned channel of a multiple access protocol, transmitting in response to the control signals and in a spatially separate fashion, the selected data streams on the assigned channel of the multiple access protocol and utilizing co-located electric dipole and magnetic dipole antennae at the subscriber unit to receive the selected data streams. The system comprises means for generating control signals to configure a base transceiver station to transmit selected data streams to a corresponding subscriber unit on an assigned channel of a multiple access protocol, means for transmitting in response to the control signals and in a spatially separate fashion, selected data streams on the assigned channel of the multiple access protocol and means for utilizing co-located electric dipole and magnetic dipole antennae at the subscriber unit to receive the selected data streams.

28 Claims, 8 Drawing Sheets